(12) United States Patent
Reiser et al.

(10) Patent No.: US 7,056,609 B2
(45) Date of Patent: Jun. 6, 2006

(54) SYSTEM AND METHOD FOR STARTING A FUEL CELL STACK ASSEMBLY AT SUB-FREEZING TEMPERATURE

(75) Inventors: Carl A. Reiser, Stonington, CT (US); Gennady Resnick, South Windsor, CT (US)

(73) Assignee: UTC Fuel Cells, L.L.C., South Windsor, CT (US)

( * ) Notice: Subject to any disclaimer, the term of this patent is extended or adjusted under 35 U.S.C. 154(b) by 166 days.

(21) Appl. No.: 10/396,894

(22) Filed: Mar. 25, 2003

(65) Prior Publication Data

US 2004/0191581 A1 Sep. 30, 2004

(51) Int. Cl.
*H01M 8/00* (2006.01)
*H01M 2/00* (2006.01)
(52) U.S. Cl. .......................... 429/13; 429/34
(58) Field of Classification Search ................. 429/13, 429/26, 34
See application file for complete search history.

(56) References Cited

U.S. PATENT DOCUMENTS

| | | | | |
|---|---|---|---|---|
| 5,100,744 | A  * | 3/1992 | Harashima | 429/22 |
| 6,299,996 | B1 * | 10/2001 | White et al. | 429/22 |
| 6,399,231 | B1 * | 6/2002 | Donahue et al. | 429/13 |
| 6,777,115 | B1 * | 8/2004 | Reiser | 429/13 |

* cited by examiner

*Primary Examiner*—Patrick Joseph Ryan
*Assistant Examiner*—Thomas H. Parsons

(57) ABSTRACT

A method for operating a fuel cell stack assembly having a plurality of fuel cells arranged in a stack to define opposed end fuel cells, wherein the plurality of fuel cells include intermediate fuel cells between the opposed end fuel cells, including feeding fuel and oxidant to the intermediate fuel cells whereby the at least one end fuel cell transports hydrogen across the cell and produces heat.

10 Claims, 1 Drawing Sheet

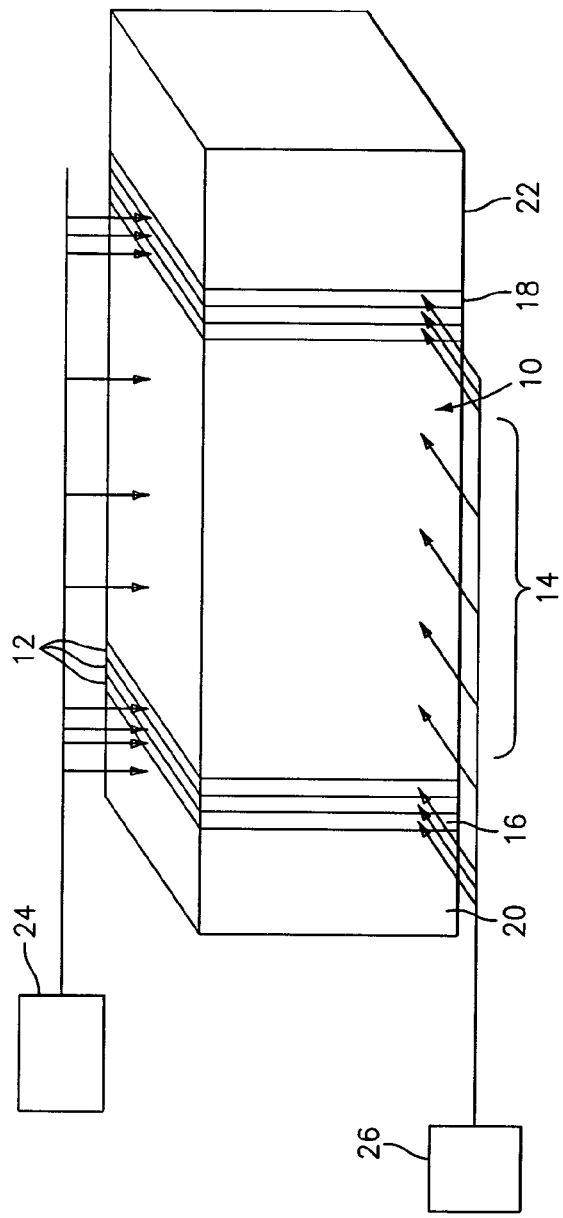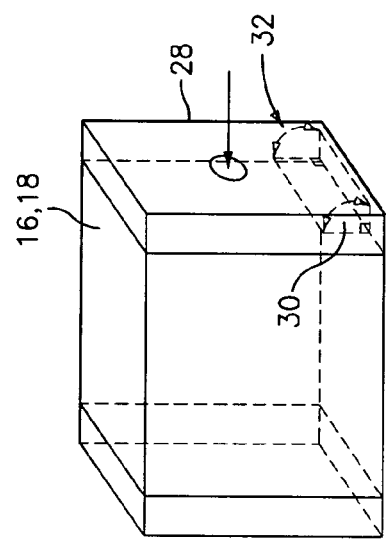

SYSTEM AND METHOD FOR STARTING A FUEL CELL STACK ASSEMBLY AT SUB-FREEZING TEMPERATURE

BACKGROUND OF THE INVENTION

The invention relates to fuel cells and, more particularly, to a system and method for operating a fuel cell stack assembly which assists in start up at sub-freezing temperatures.

Fuel cells are useful as an alternative for converting hydrogen containing fuel and oxidant into energy. Such fuel cells have many desirable applications, some of which involve exposing the fuel cell to sub-freezing conditions.

A typical fuel cell, especially a typical PEM fuel cell, includes a series of fuel cell assemblies arranged in a stack which defines end fuel cells. Opposite to each end fuel cell, end plate/current collectors are typically positioned which are relatively large-mass structures.

Water is generated during operation of a fuel cell and, when operation of a fuel cell is stopped, this water can freeze when exposed to sub-freezing temperatures. Freezing of this water can be extremely problematic depending upon where the water is when it freezes.

One approach has been to allow the cell to freeze only after all water has been drained except that water which resides in the pores of the water transfer plates, in the membrane electrode assemblies, and a small undrainable amount of water in the cell substrates. Such a cell will start without difficulty because heat released during initial operation is sufficient to melt the water in the water transfer plates before water production exceeds the capacity of the substrates to store the product water without blocking oxidant access to the catalyst. Once the water transfer plate water has melted, pressure difference between the oxidant compartments and the cooling compartments provides means to drive water from the catalysts, through the substrates and pores in the water transfer plate, and into the virtually limitless reservoir provided by the empty coolant channels. This permits the cell stack assembly to self-heat to normal operating temperature.

One persisting problem, however, is with the end cells. The thermal mass of pressure plates or current collectors at the end of the stack prevents melting of frozen water in the water transfer plate pores before capacity of the substrates to absorb the product water is exceeded. Consequently, oxidant access to the catalyst layer in these end cells is eliminated. In the process, water is forced into the catalyst layer and bi-layer pores with sufficient force to prevent easy withdrawal once all of the cells in the stack reach normal operating temperature.

Clearly, a solution to this problem is needed.

It is therefore the primary object of the present invention to provide a system and method for facilitating startup from sub-freezing conditions.

Other objects and advantages of the present invention will appear herein below.

SUMMARY OF THE INVENTION

In accordance with the present invention, the foregoing objects and advantages have been readily attained.

According to the invention, a method is provided for operating a fuel cell stack assembly comprising a plurality of fuel cells arranged in a stack to define opposed end fuel cells, wherein said plurality of fuel cells include intermediate fuel cells between said opposed end fuel cells, comprising feeding fuel and oxidant to said intermediate fuel cells whereby said at least one end fuel cell transports hydrogen across the cell and produces heat.

Such operation of the end fuel cell(s) advantageously serves to generate heat to assist in the boot-strap startup, to insulate the intermediate cells from the temperature effects of the massive pressure or current collector plates at the end of the stack, and to operate the problematic portions of the stack in a manner whereby blockage of oxidant flow and/or inefficient operation due to non-uniform heating is not a problem.

In further accordance with the present invention, a fuel cell stack assembly is provided which comprises a plurality of fuel cells arranged in a stack defining opposed end fuel cells and intermediate fuel cells positioned therebetween, a fuel supply system for feeding fuel to said plurality of fuel cells, an oxidant supply system for feeding oxidant to said plurality of fuel cells, wherein at least one end fuel cell of said opposed end fuel cells is operable in a hydrogen pumping mode wherein fuel is fed to said at least one end fuel cell to produce heat and pump hydrogen across the cell.

BRIEF DESCRIPTION OF THE DRAWING(S)

A detailed description of preferred embodiments of the present invention follows, with reference to the attached drawings, wherein:

FIG. 1 schematically illustrates a fuel cell stack assembly in accordance with the present invention; and FIG. 2 schematically illustrates a suitable flow control mechanism for selectively operating end fuel cells as hydrogen pumps according to the invention.

DETAILED DESCRIPTION

The invention relates to fuel cells and, more particularly, to a fuel cell stack assembly and method for operating same wherein end fuel cells are operated as hydrogen pumps, that is, the end fuel cells are operated to produce heat and transport hydrogen across the cell, whereby intermediate fuel cells in the assembly are insulated from the temperature effects of end/pressure plates, wherein generated heat helps to melt frozen water and assist in the boot strap startup-of the assembly, and whereby end fuel cells which can have performance problems during normal operation after start up due to blocked oxidant flow are operated in a manner wherein blocked oxygen flow is not a critical problem.

FIG. 1 schematically illustrates a typical fuel cell stack assembly 10 in accordance with the present invention. Fuel cell stack assembly 10 typically includes a plurality of substantially planar fuel cells 12 which are arranged in a stack so as to define a plurality of intermediate cells 14 and two opposed end cells 16, 18. Positioned adjacent to end cells 16, 18 are typically somewhat massive current collector plates or pressure plates, schematically illustrated at 20 and 22. These components will be referred to hereinafter as pressure plates 20, 22.

As mentioned above, pressure plates 20, 22 serve to slow the warming of end plates 16, 18, and thereby interfere with the heating of these components during startup from sub-freezing temperatures. In accordance with the present invention, end fuel cells 16, 18 are operated as hydrogen pumps so as to generate heat and transport hydrogen, and thereby insulate intermediate fuel cells 14 from the temperature effects of pressure plates 20, 22, and thereby enhance startup of fuel cell stack assembly 10 from sub-freezing conditions. When operating end fuel cells 16, 18 as hydrogen pumps, hydrogen transported across the cell can be vented into the oxidant flow channel where the hydrogen is allowed to mix with the oxidant exit stream.

During normal operation of a fuel cell stack such as fuel cell stack assembly 10, a fuel supply system 24 and an oxidant supply system 26 are operated so as to feed each cell with a flow of fuel and oxidant. Within the cell, these flows pass on either side the respective electrodes in well known fashion to generate the desired current.

In accordance with the present invention, one or both of end fuel cells 16, 18 are operated without a flow of oxidant, and only with a flow of fuel, whereby the reaction carried out in such cells is one which transports hydrogen across the cell and produces heat. This type of operation of a fuel cell is referred to herein as a hydrogen generating mode, and cells operated in such manner are referred to herein as hydrogen pumps.

Such operation of end fuel cells 16, 18 advantageously serves to generate heat which enhances melting of water frozen within end cells 16, 18, and which serves to insulate the remainder of the stack, that is, intermediate cells 14, from the temperature influence of pressure plates 20, 22 which would otherwise tend to slow heating of cells adjacent thereto. It should be noted that end cells 16, 18 can include more than a single end cell. The number of cells on either end is dependent on the heat load required for the start up process of any particular cell stack design considerations.

In accordance with the present invention, end fuel cells 16, 18 can be permanently operated as hydrogen pumps, or more preferably can be selectively operated as hydrogen pumps or normal fuel cells. During hydrogen transport mode, feed of oxidant to end fuel cells 16, 18 is selectively blocked so as to allow hydrogen transport and heat in these end fuel cells as desired, while intermediate fuel cells 14 continue to be fed with both oxidant and fuel for normal fuel cell operation. Following the need for operation of end fuel cells 16, 18 in hydrogen pumping mode, for example after a sufficient amount of operation time after startup from a sub-freezing condition, end fuel cells 16, 18 can be returned to normal operation by re-introduction of oxidant flow to same. In this manner, startup from sub-freezing conditions is greatly facilitated, while long-term operation of the fuel cell is not affected in any way.

Oxidant flow to end fuel cells 16, 18 can be selectively controlled utilizing various mechanisms. One preferred embodiment of the present invention is to provide a rotatable shutter or other flow control mechanism in either or both of an oxidant inlet or oxidant outlet of end fuel cells 16, 18, so as to allow for selective control of oxidant flow through these members.

FIG. 2 shows an end fuel cell 16, 18 having a suitable flow control mechanism for selectively allowing and blocking flow of oxidant to the cell. FIG. 2 shows end fuel cell 16, 18 having an oxidant intake manifold 28 having a flow port 30 for allowing flow into the cell. A rotatable shutter 32 is positioned relative to port 30 and positionable between a closed position wherein port 30 is substantially blocked, and an open position wherein port 30 is substantially open. Shutter 32 can advantageously be operated either manually or by a control system, as desired, and advantageously serves to allow for end fuel cells 16, 18 to be selectively operable as hydrogen pumps or as fuel cells, as desired. Of course, FIG. 2 shows one embodiment of a suitable flow control mechanism, and other flow control mechanisms could be used as well.

Operation of end fuel cells 16, 18 as hydrogen pumps during startup from sub-freezing conditions impact slightly upon the efficiency of the cell, but this impact is not sufficient to be problematic. The impact upon efficiency of such operation is inversely proportional to the number of cells in the stack. Thus, for a 250 Cell stack, with operation of both end cells in hydrogen pump mode, the fuel efficiency would be reduced by less than 1 percent.

The system and method of the present invention advantageously serve to avoid the need for various types of heaters and the like which have otherwise been proposed for use in startup from sub-freezing conditions of various fuel cell assemblies. Thus, the need for costly and control intensive components is obviated by the system and method of the present invention.

It should readily be appreciated that the system and method of the present invention advantageously provide for startup of a fuel cell stack assembly from sub-freezing conditions which overcomes substantial problems previously encountered, and which can be incorporated without the need for potentially expensive and complex additional equipment.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for operating a fuel cell stack assembly comprising a plurality of fuel cells arranged in a stack to define opposed end fuel cells, wherein said plurality of fuel cells include intermediate fuel cells between said opposed end fuel cells, comprising feeding fuel and oxidant to said intermediate fuel cells and feeding fuel and no oxidant to said at least one end fuel cell whereby said at least one end fuel cell transports hydrogen across the cell and produces heat.

2. The method of claim 1, further comprising selectively feeding said at least one end fuel cell with said fuel and no oxidant so as to transport said hydrogen and generate said heat, whereby said heat assists in startup of said fuel cell stack assembly from a sub-freezing condition.

3. The method of claim 2, wherein said step of selectively feeding said at least one end fuel cell comprises selectively blocking and unblocking oxidant flow through said at least one end fuel cell.

4. The method of claim 3, wherein said fuel cell stack assembly further comprises a flow control member for selectively allowing and blocking flow of oxidant to said at least one end fuel cell, and feeding step comprises selectively operating said flow control member.

5. The method of claim 1, wherein said feeding fuel and no oxidant step comprises feeding said fuel and no oxidant to both of said opposed end fuel cells whereby both of said opposed end fuel cells transfer said hydrogen and produce said heat.

6. A fuel cell stack assembly, comprising:
   a plurality of fuel cells arranged in a stack defining opposed end fuel cells and intermediate fuel cells positioned therebetween;
   a fuel supply system for feeding fuel to said plurality of fuel cells;
   an oxidant supply system for feeding oxidant to said plurality of fuel cells; and
   means for the operating and said stack in a startup mode wherein fuel is fed to said at least one end fuel cell of said opposed end fuel cells and oxidant is not fed to said at least one end fuel cell, and wherein fuel and oxidant are fed to said intermediate fuel cells.

7. The apparatus of claim 6, wherein said stack is selectively operable in said startup mode and in a normal operation mode wherein said fuel and said oxidant are fed to said at least one end fuel cell so as to generate electric current.

8. The apparatus of claim 7, wherein said means for operating comprises a flow control member.

9. The apparatus of claim 8, wherein said flow control member comprises a rotatable shutter positioned in at least one of an oxidant inlet and an oxidant outlet of said at least one end fuel cell.

10. The apparatus of claim 7, wherein each of said opposed end fuel cells has a flow control member adapted to selectively control flow from said oxidant supply system to said at least one end fuel cell.

* * * * *